United States Patent
Spittael et al.

(10) Patent No.: US 7,950,374 B2
(45) Date of Patent: May 31, 2011

(54) DEVICE FOR SUPPLYING FUEL TO AN ENERGY PRODUCING INSTALLATION OF A SHIP

(75) Inventors: Laurent Spittael, Voisins le Bretonneux (FR); Camille Hypousteguy, Versailles (FR); Yann Xitra, Magny les Hameaux (FR)

(73) Assignee: Gaztransport et Technigaz, Saint-Remy-les-Chevreuse (FR)

( * ) Notice: Subject to any disclaimer, the term of this patent is extended or adjusted under 35 U.S.C. 154(b) by 254 days.

(21) Appl. No.: 12/366,981

(22) Filed: Feb. 6, 2009

(65) Prior Publication Data

US 2009/0199909 A1  Aug. 13, 2009

(30) Foreign Application Priority Data

Feb. 8, 2008 (FR) ...................... 08 50794

(51) Int. Cl.
*F02M 37/08* (2006.01)
*F02M 37/00* (2006.01)
(52) U.S. Cl. ...................... 123/514; 123/509
(58) Field of Classification Search ............ 123/509, 123/510, 511, 514; 417/87
See application file for complete search history.

(56) References Cited

U.S. PATENT DOCUMENTS

| | | | | |
|---|---|---|---|---|
| 5,878,724 A | * | 3/1999 | Channing | 123/514 |
| 6,098,600 A | * | 8/2000 | Umetsu et al. | 123/514 |
| 6,123,511 A | * | 9/2000 | Sertier | 417/87 |
| 6,532,941 B2 | * | 3/2003 | Begley et al. | 123/497 |
| 6,832,602 B2 | * | 12/2004 | Tanimura | 123/509 |
| 6,997,168 B2 | * | 2/2006 | Schueler et al. | 123/497 |
| 7,303,378 B2 | * | 12/2007 | Kleppner et al. | 417/87 |
| 7,353,807 B2 | * | 4/2008 | Paluszewski | 123/509 |

FOREIGN PATENT DOCUMENTS

| | | |
|---|---|---|
| DE | 43 35 858 | 4/1995 |
| DE | 43 36 060 | 4/1995 |
| FR | 1346090 | 12/1963 |
| FR | 2 753 658 | 3/1998 |
| FR | 2 832 783 | 5/2003 |

OTHER PUBLICATIONS

French Search Report dated Sep. 25, 2008, from corresponding French application.

* cited by examiner

*Primary Examiner* — Mahmoud Gimie

(74) *Attorney, Agent, or Firm* — Young & Thompson

(57) ABSTRACT

A device for supplying fuel from an onboard energy producing installation on a ship transporting liquefied gas from at least one tank (2) of liquefied gas of said ship, comprising a pump (20) arranged in the bottom of the tank and a reservoir (23) arranged in the tank around the pump and designed to maintain a suction of the pump in a submerged state, characterized in that it comprises a liquid ejector (12) arranged in the tank so as to be able to suction the liquefied gas at the bottom of the tank, and a liquid circuit (21, 22, 24, 250) connecting an outlet of the pump to an inlet of the ejector, on one hand, and an outlet of the ejector to the reservoir, on the other hand.

8 Claims, 3 Drawing Sheets

DEVICE FOR SUPPLYING FUEL TO AN ENERGY PRODUCING INSTALLATION OF A SHIP

CROSS-REFERENCE TO RELATED APPLICATIONS

The present invention claims benefit of priority to and incorporates by reference French Application 0850794 filed Feb. 8, 2008.

STATEMENT REGARDING FEDERALLY SPONSORED RESEARCH OR DEVELOPMENT

None.

THE NAMES OF THE PARTIES TO A JOINT RESEARCH AGREEMENT

None.

INCORPORATION-BY-REFERENCE OF MATERIAL SUBMITTED ON A COMPACT DISC

None.

BACKGROUND OF THE INVENTION (1) Field of the Invention

The present invention relates to a device for supplying fuel to an energy producing installation onboard a liquefied gas transport ship from a liquefied gas tank of said ship.

(2) Description of Related Art Including

In a liquefied gas transport ship, for example of the methane tanker type, an energy producing installation is provided to meet the energy needs of the ship's operation, in particular for the propulsion of the ship and/or the production of electricity for the vessel's equipment. An installation of this type commonly comprises heat engines consuming gas coming from an evaporator which is fed from the liquefied gas cargo transported in the tanks of the ship.

FR-A-2837783 provides for feeding an evaporator of this type and/or other systems needed for propulsion using a pump submerged at the bottom of a tank of the ship. A pump thus placed has drawbacks when one wishes to feed the propulsion of a methane tanker with gas during ballasted travel, i.e. when the tanks have been discharged. In this case, it is necessary to leave a liquefied gas nose at the bottom of the tanks sufficient to enable operation of the pump. Indeed, if the liquid level is too low, the pump is led to pump, at times, a mixture of liquid and gas due to the movements of the cargo, which risks stalling or even seriously damaging the pump (poor cooling, intensity drop, etc.).

FR-A-2832783 proposes to avoid these problems by surrounding the pump, still placed at the bottom of the tank, with a collecting housing provided with check valves, with a view to ensuring continuous immersion of the suction of the pump even when the tank is not very full and the ship is subject to pitch and roll motions. The reliability and effectiveness of this device are limited, in particular because the valves can become stuck and no longer perform their function, and because the filling of the collecting housing requires sufficiently regular wave motions, which fill the housing by submersion.

FR-A-2876981 describes a supply device in which one provides a pump on the bridge of the ship, connected to a liquid ejector arranged in the bottom of the tank. This solution requires complementary elements on the bridge of the ship, in particular an auxiliary reservoir, the thermal insulation of which must be ensured.

BRIEF SUMMARY OF THE INVENTION

The present invention aims to provide a supply device which does not have at least some of the aforementioned drawbacks of the prior art. In particular, the present invention aims to provide a pump supply device arranged in the tank, in which the risk of stalling or damaging the pump is avoided or reduced.

For this, the invention provides a device for supplying fuel for an energy producing installation onboard a ship transporting liquefied gas from at least one liquefied gas tank of said ship, comprising a pump arranged in the bottom of the tank and a reservoir arranged in the tank around the pump and designed to maintain suction of the pump in a submerged state, characterized in that it comprises a liquid ejector arranged in the tank so as to be able to suction the liquefied gas at the bottom of the tank, and a liquid circuit connecting an outlet of the pump to an inlet of the ejector, on one hand, and an outlet of the ejector to the reservoir, on the other hand.

In the sense of the invention, a liquid ejector, also called liquid jet pump, designates a type of pump comprising a pipe in which the life force of a flow of injected pressurized liquid causes suction of the liquid which arrives at the periphery of the pipe.

The ejector in general allows suction with a lower liquid level than a traditional pump, which implies the possibility of filling the reservoir in order to maintain the suction of the pump in a submerged state, even when the liquid level in the tank is low. It is therefore possible to discharge more liquid at the discharge terminal of the ship. Moreover, the surge does not influence the submerged state of the suction of the pump.

The ejector can operate on empty (without liquid to suction) without risk of damage or stalling. The absence of mechanical parts in motion implies easy placement and great reliability, and little or no maintenance requiring technical stopping of the ship.

According to one embodiment, the reservoir is located away from the ejector. This allows great freedom in positioning the ejector and the reservoir, which are connected by the liquid circuit. For example, the ejector can be arranged in the tank to capture liquid where the probability of its presence is the greatest, when considering the movements of liquid in the tank during transport by ship. The pump and reservoir assembly can be placed in the tank while taking its bulk and mechanical resistance into account.

According to another embodiment, the ejector is in contact with or located in the reservoir. The assembly formed by the reservoir and the ejector can be preassembled and installed easily in the tank. The liquid circuit is simpler.

Advantageously, the reservoir has a profile facilitating recovery of liquid by a wave movement of the tank's liquid. Moreover, the liquid circuit connects the outlet of the ejector to the reservoir.

According to one particular embodiment, the reservoir has a volume smaller than 1 m$^3$.

Advantageously, the ejector comprises a suction tube whereof one inlet is located at a height smaller than the height of the suction of the pump.

Preferably, the supply device comprises a supply conduit connecting the liquid circuit to the energy producing installation.

Advantageously, the supply conduit is connected to the liquid circuit between the outlet of the ejector and the reservoir. In this case, the flow which the pump must provide is limited. Moreover, it is not necessary to provide a return conduit between the supply conduit and the reservoir.

According to one particular embodiment, said fluid circuit comprises a control valve for the pump downstream from the pump and upstream from the supply conduit, and a control valve for the ejector downstream from the supply conduit and upstream from the ejector.

Advantageously, the supply device comprises a return conduit connecting the supply conduit to the reservoir, a return control valve arranged on the return conduit and controlled by a pressure sensor arranged on the supply conduit.

Preferably, the supply device comprises a discharge pump connected to said liquid circuit upstream from the ejector.

The invention also proposes a liquefied gas transport ship comprising at least one tank of liquefied gas and an onboard energy producing installation, characterized in that it comprises a supply device according to the invention above connecting said tank to said installation to supply this installation with fuel from this tank.

BRIEF DESCRIPTION OF THE SEVERAL VIEWS OF THE DRAWINGS

The invention will be well understood, and other aims, details, characteristics and advantages thereof will appear more clearly during the following description of several particular embodiments of the invention, provided solely as non-limiting examples, in reference to the appended drawings. In these drawings.

DETAILED DESCRIPTION OF THE INVENTION

A methane tanker comprises tanks, for example four in number, which are leaktight and thermally insulated for the storage of the liquefied gas cargo, for example a gas with high methane content at approximately −160° C. At the rear of the ship a machine room is provided which comprises heat engines operating by combustion from gas coming from the tanks, for example steam producing boilers serving to feed steam turbines for the propulsion of the ship and/or electricity production.

When the ship circulates with its tanks full, the natural evaporation of gas in the tanks generally produces a significant quantity of fuel to ensure the operation of the machines in the machine room. Traditionally, these evaporation gases are collected by a steam collector (not shown) circulating on the upper bridge of the ship. However, when the ship is operating ballasted, i.e. after discharging of its tanks, it is necessary to pump the liquefied gas nose remaining in one or several of the tanks in order to feed the ship's propulsion system and the ship is equipped for this purpose with a supply device as illustrated in FIG. 1.

Figure 1:
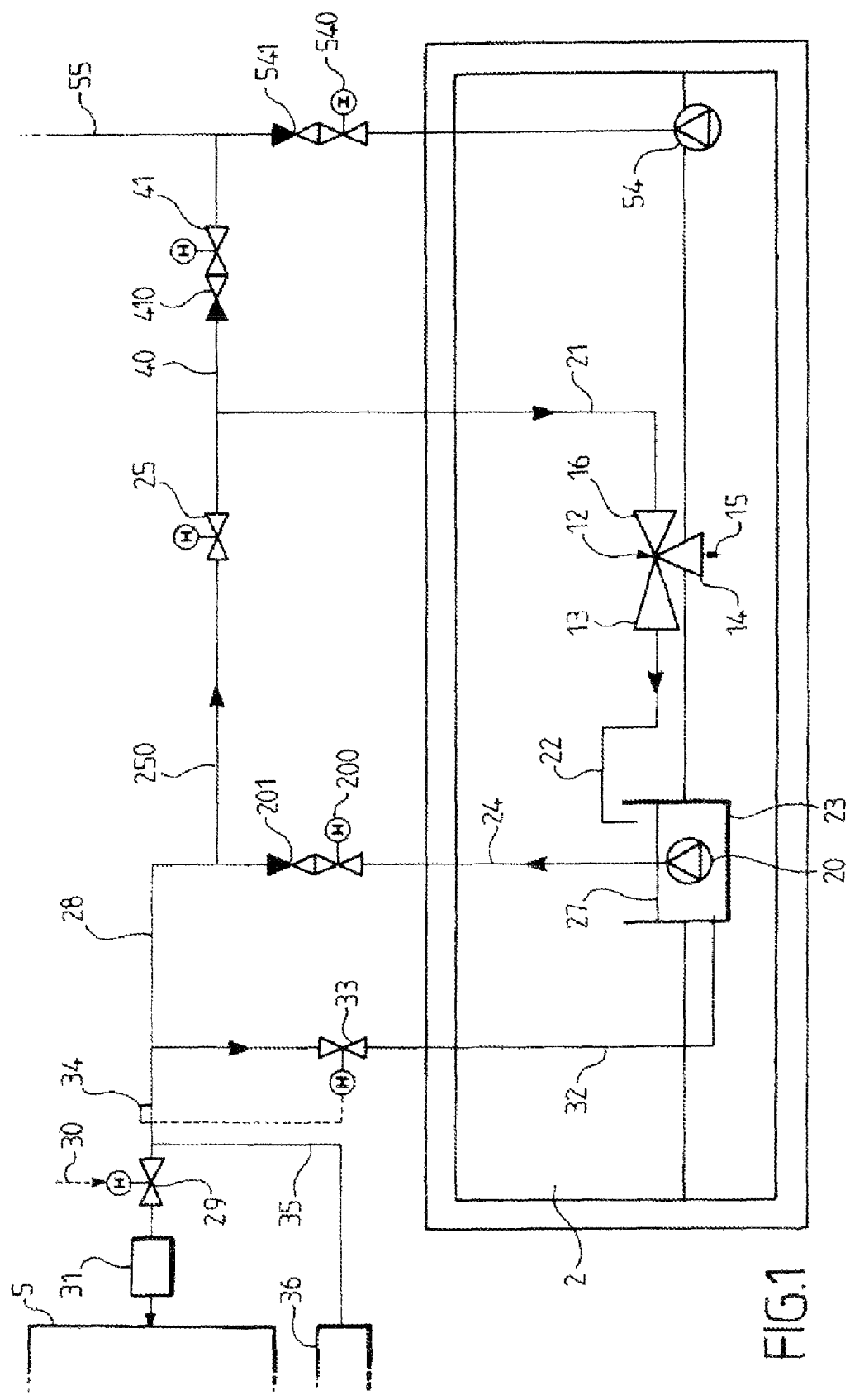
FIG. 1 is an operational diagram of a supply device according to a first embodiment of the invention.

The supply device of FIG. 1 comprises a liquid ejector 12 arranged at the bottom of a tank 2. A liquid ejector of this type is well known by those skilled in the art, such that it is pointless to provide a detailed description of it. Diagrammatically, it comprises a convergent/divergent nozzle through which one circulates a stream of liquid which serves as a drive current. It also comprises a suction tube 14 oriented toward the bottom of the tank and which opens laterally into the nozzle. The drive current in the nozzle causes a suction of liquefied gas through the suction tube 14 as indicated by the arrow 15.

In order to create the drive current, one provides a pump 20 arranged in the bottom of the tank 2. The outlet of the pump 20 is connected by a conduit 24, a conduit 250 and a conduit 21 to the inlet 16 of the ejector. A conduit 22 connects the outlet 13 of the ejector to a reservoir 23, arranged in the tank 2 around the pump 20. The reservoir 23 is designed to receive the liquefied gas coming from the conduit 22 or a wave of liquid. It has a volume smaller than 1 m$^3$, and serves to temporarily store the liquid ejected by the ejector 12 in order to maintain the suction of the pump 20 in a submerged state. The conduits 21, 22, 24, 250 and the reservoir 23 thus form a liquid circuit which allows the circulation of a drive current through the ejector 12 in a loop.

A control valve 25 is mounted on the conduit 250 between the outlet of the pump 20 and the inlet of the ejector 12 in order to regulate the flow of drive liquid in the conduit 21. The opening of the valve 25 is regulated automatically. Such a regulation avoids having the level of liquid 27 in the reservoir 23 drop below a certain threshold, which would risk causing stalling of the pump 20 and damaging it. The reservoir 23 constitutes, in operation, a reserve of liquid which makes it possible to ensure a continuous input flow in the pump 20 even if the ejector 12 is temporarily emerged, for example due to cargo movements in the swell, and the flow of liquefied gas output from the ejector 12 is therefore irregular.

The presence of the reservoir 23 therefore makes it possible to further decrease the filling level of the tank 2 via which feeding of the machines is made possible. The ejector 12 is in fact capable of operating by intermittence, i.e. capturing the wave of liquefied gas which comes and goes at the bottom of the tank at each passage at the ejector. In FIG. 1, the level of liquid in the tank 2 is illustrated below the suction of the pump 20, but above the inlet of the suction tube 14. The reservoir 23 enables correct operation in this state because it keeps the level 27 above the suction of the pump.

A supply conduit 28 connects on the conduit 250 between the pump outlet 20 and the valve 25. The supply conduit 28 makes it possible to bring part of the liquefied gas circulating in the conduit 250 toward the energy producing installation needing to be fed in the machine room 5. To regulate the outgoing flow through the supply conduit 28, this is provided with a flow control valve 29 the opening and closing of which are controlled according to the consumption of the machines using a request signal illustrated by the arrow 30 coming from a control device of the thermal machines in the machine room 5. Downstream from the valve 29, the supply conduit 28 opens into a vaporizer 31 serving to vaporize the liquefied gas for its provision in gaseous form to the machines to be fed. A return conduit 32 connects on the supply conduit 28 upstream from the valve 29 and opens into the reservoir 23. The return conduit 32 allows the return of liquefied gas toward the reservoir 23 when the pressure in the supply conduit 28 is too high. For this, the conduit 32 is provided with a control valve 33 regulated according to the measurement signal of a pressure gauge 34 measuring the pressure in the conduit 28. Upstream from the valve 29, a conduit 35 connects on the supply conduit 28 and opens into the auxiliary systems 36.

In operation, the flow downstream from the pump 20 is controlled by a valve 200 arranged on the conduit 24. The valve 200 is equipped with an check valve 201.

To start the supply device, it may be necessary to supply the liquid ejector 12 using means other than the pump 20. For this, the discharge pump 54 or any other pump via the conduit 55, used to discharge the tank 2 at the terminal, is connected to the conduit 21 by a filling conduit 40 provided with a filling control valve 410 and a discharge control valve 540. The valves 41 and 540 are equipped with check valves, 410 and 541, respectively.

The device described makes it possible to supply fuel from one or several tanks 2 of the ship. In the second case, a pump 20, a reservoir 23 and a liquid ejector 12 are placed similarly in each of the tanks used.

Figure 2:
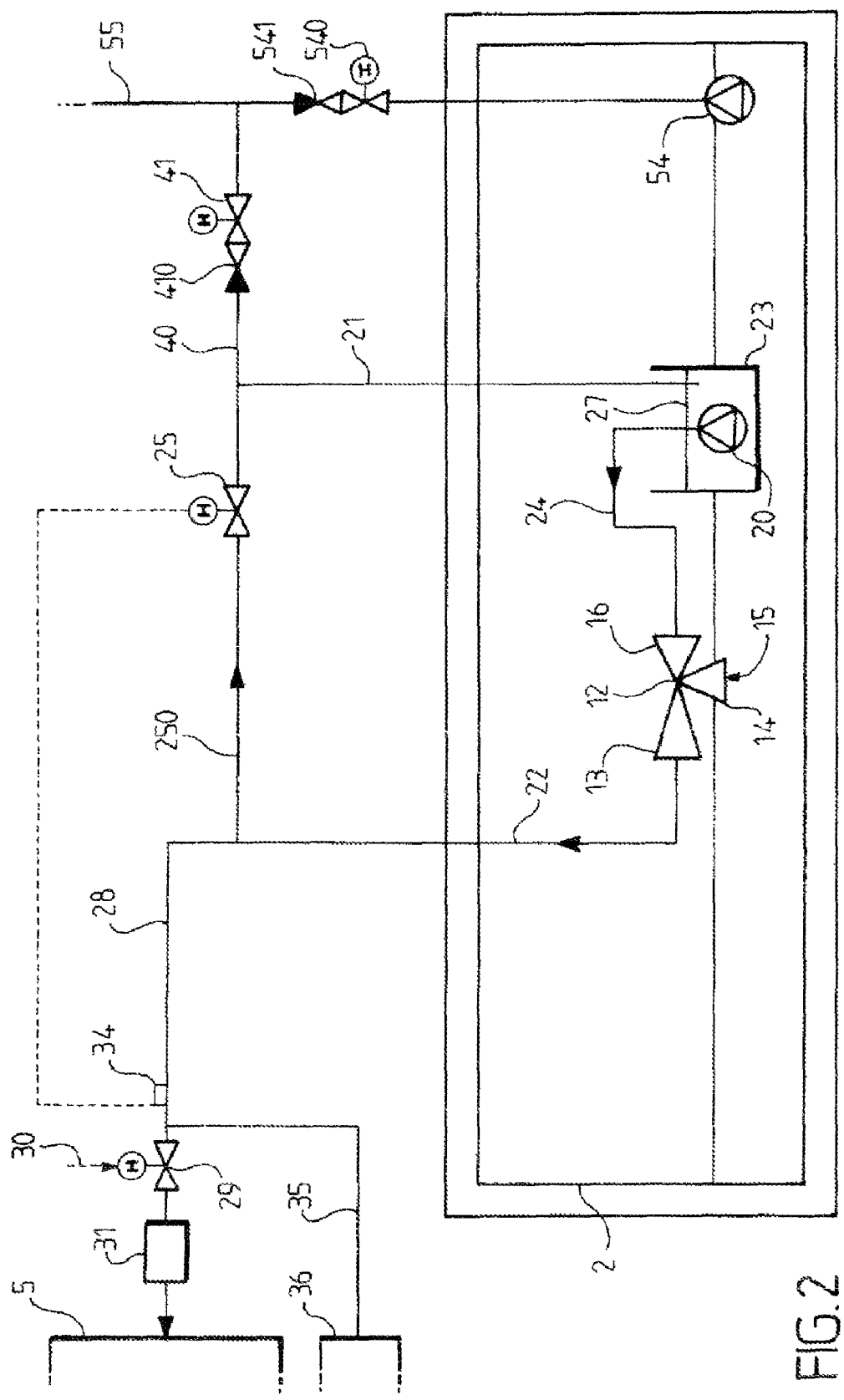
FIG. 2 is an operational diagram of a supply device according to a second embodiment of the invention.

FIG. 2 illustrates another embodiment of a supply device. In this figure, the same reference numbers were used to designate identical or similar elements corresponding to the embodiment of FIG. 1.

In the embodiment of FIG. 2, the positions of the ejector 12 and the pump 20 are inverted relative to FIG. 1: the pump 20 is upstream from the ejector 12. The pump 20 is still used to cause the liquid to circulate, but it is the flow driven back by the ejector 12 which feeds the energy producing device via the supply conduit 28. The flow surplus is returned to the reservoir 23 by the conduits 250 and 21 and ensures a sufficient level of liquid to avoid stalling of the pump 20.

Relative to the embodiment of FIG. 1, the flow which the pump must drive back is lower. Indeed, the pump must only supply a flow sufficient for the operation of the ejector, whereas in the embodiment of FIG. 1 it must also provide a flow for the supply conduit 28.

In this embodiment, the sensor 34 also makes it possible to regulate the pressure upstream from the vaporizer 31 by acting, in this case, on the valve 25. The conduits 250 and 21 serve as return conduit, and it is not necessary to provide a specific conduit such as the conduit 32 of the embodiments of FIGS. 1 and 3.

In one variation not illustrated, a phase separator is arranged downstream from the ejector 12.

Figure 3:
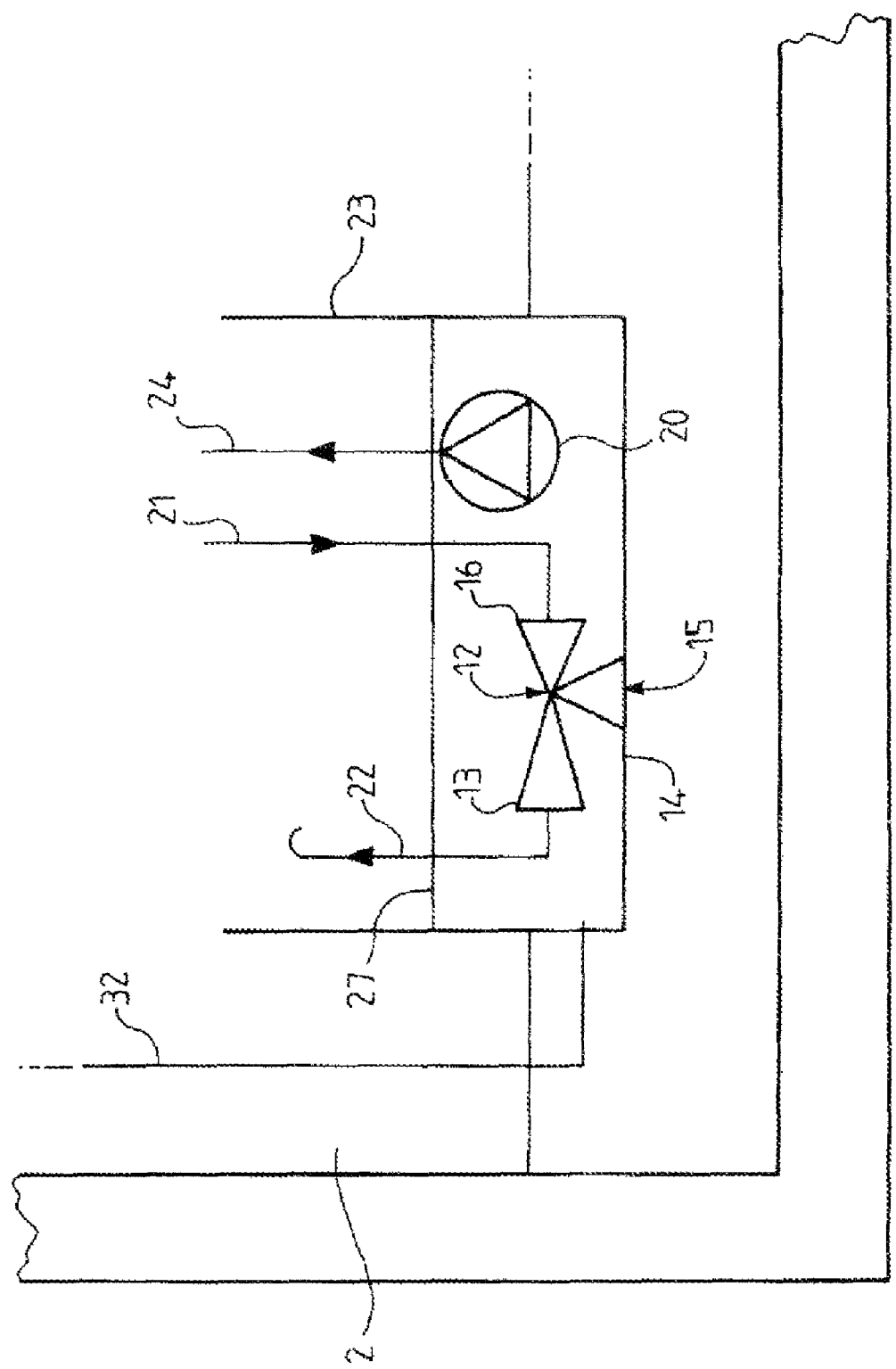
FIG. 3 is a partial operational diagram of a supply device according to a third embodiment of the invention.

FIG. 3 partially illustrates another embodiment of a supply device. In this figure, the same reference numbers were used to designate elements identical or similar to corresponding elements of the embodiment of FIG. 1.

In the embodiment of FIG. 3, the ejector 12 is arranged in the reservoir 23. Its suction tube 14 is found at the base of the reservoir 23 and opens into the tank 2. Its outlet 13 pours the pumped liquid freely into the reservoir 23. In this embodiment, the reservoir 23 and the ejector 12 can be realized combined in a single element to be installed in the tank 2.

Although the invention has been described in connection with several particular embodiments, it is quite clear that it is in no way limited and that it includes all technical equivalents for the means described as well as their combinations if they are within the framework of the invention.

The invention claimed is:

1. A supply device for supplying fuel to an energy producing installation on a ship transporting liquefied gas from at least one tank (2) of liquefied gas of said ship, comprising:
   a pump (20) arranged in the bottom of the tank and a reservoir (23) arranged in the tank around the pump and designed to maintain a suction of the pump in a submerged state;
   a liquid ejector (12) arranged in the tank so as to be able to suction the liquefied gas at the bottom of the tank;
   a first liquid circuit connecting an outlet of the pump to an inlet of the ejector;
   a second liquid circuit connecting an outlet of the ejector to the reservoir; and
   a supply conduit (28) connecting the second liquid circuit to the energy producing installation,
   wherein the supply conduit (28) is connected to the second liquid circuit between the outlet of the ejector and the reservoir.

2. The supply device according to claim 1, in which the reservoir is located away from the ejector.

3. The supply device according to claim 1, in which the ejector is in contact with or located in the reservoir.

4. The supply device according to claim 1, in which the reservoir has a profile allowing filling by the liquid coming from the full tank or by a wave of liquefied gas.

5. The supply device according to claim 1, in which said reservoir has a volume smaller than 1 m³.

6. The supply device according to claim 1, in which said ejector comprises a suction tube (14) whereof one inlet is located at a height below the height of the suction of the pump.

7. The supply device according to one claim 1, further comprising:
   a discharge pump (54) or any other pump of the ship arranged to discharge liquefied gas via a conduit (55) connected to said second liquid circuit upstream from the ejector.

8. A ship transporting liquefied gas comprising:
   at least one liquefied gas tank; and
   an onboard energy producing installation, said ship further comprising: a supply device according to claim 1 connecting said tank to said installation in order to supply fuel to said installation from said tank.

* * * * *